Patented Feb. 1, 1927.

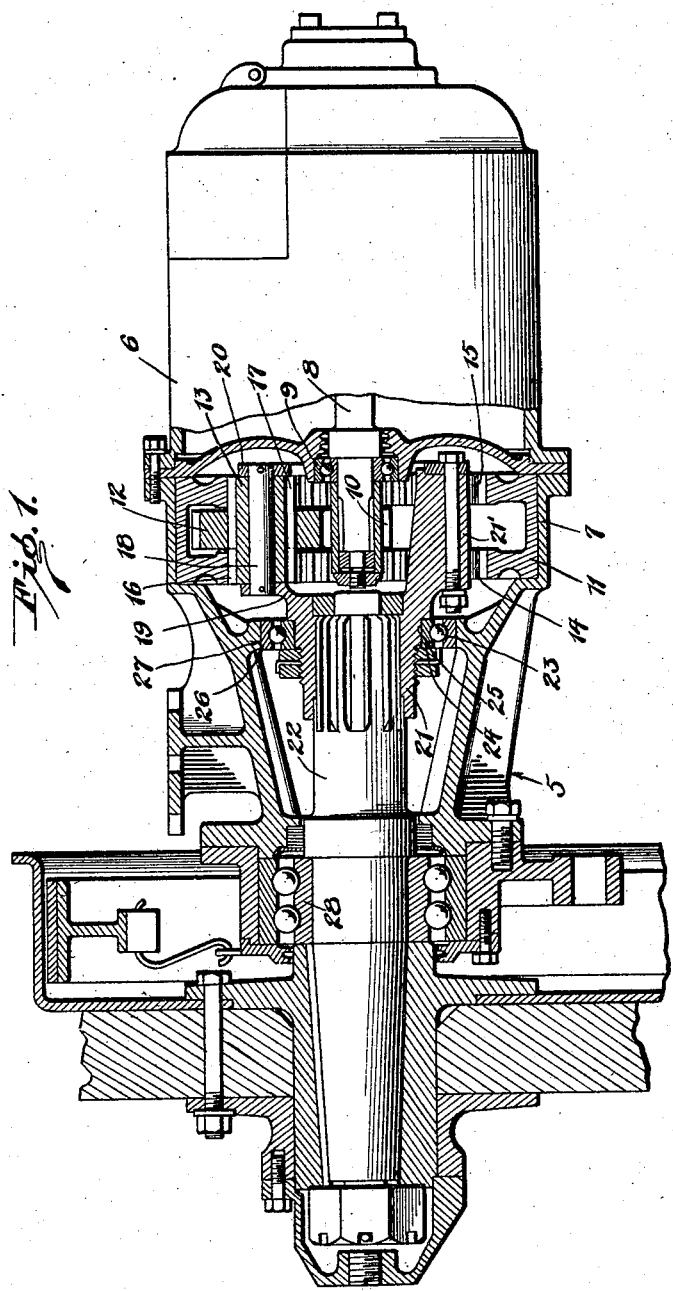

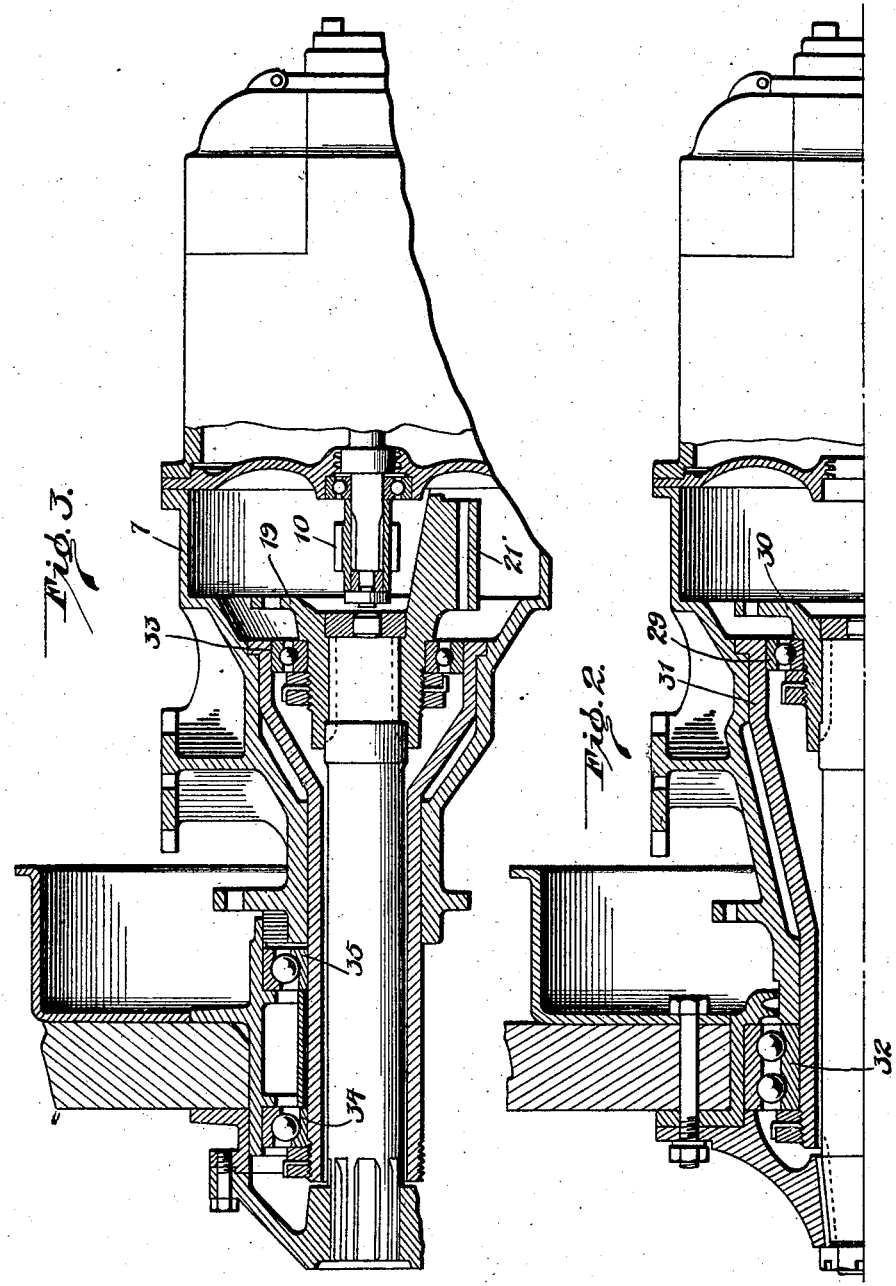

1,616,343

UNITED STATES PATENT OFFICE.

AXEL HJ. ASPROOTH, OF BALTIMORE, MARYLAND, AND ALFONSO M. LEONI, OF PHILADELPHIA, PENNSYLVANIA, ASSIGNORS TO ELECTRO-MOTIVE DEVICES, INC., OF PHILADELPHIA, PENNSYLVANIA, A CORPORATION OF NEW JERSEY.

BALANCED WHEEL DRIVE.

Application filed February 27, 1923. Serial No. 621,582.

In a companion application we have disclosed a final or wheel drive utilizing planetary gearing and a driving spider wherein we eliminate or balance all reactive forces which if not eliminated or balanced would result in distortion and seriously impair the efficiency of the drive.

We have discovered that by maintaining a perfect balance or symmetry of driving forces we can extend the sphere of usefulness of that part of our invention with marked results from the standpoint of power efficiency, stability, and economy, by embodying it in a wheel drive of the semi-floating or other floating type if and when the bearing employed to steady the inner end of the wheel driving shaft is constructed and arranged to perform the added function of supporting and centering the spider carrying the pinions of the planetary gearing system. It results that we not only secure a rythmic functioning of the gearing regardless of wear on the teeth, but provide a simple yet strong construction and incidentally effect the piloting of the wheel driving shaft both fore and aft, the advantages of which will be manifest to those skilled in the art.

The invention is illustrated in the annexed drawings, wherein—

Figure 1 is a sectional elevational view exemplifying an application to a wheel drive of the semi-floating type.

Fig. 2 is a similar view showing an application to a three-quarter floating type.

Fig. 3 is a similar view showing an application to a full floating type.

The hub bracket 5 co-operates with the motor casing 6 to form a gear housing 7. The driving shaft 8 projects into said housing and is centered therein by an annular bearing 9. The gearing comprises the driving pinion 10 fixedly mounted on shaft 8, a fixed annular rack 11, and a planetary system of pinions 12, preferably operating on roller paths 13 and meshing with the driving pinion and with the annular rack. In order to establish and maintain uniformity of pitch line contact, the annular rack 11 is of dual formation and its tracks 14 and 15 co-operate with the necked ends 16 and 17 of the pinions 12, so that all forces are balanced. The journals 18 of the pinions 12 are mounted in rings 19 and 20 carried by a spider 21 splined to the wheel driving shaft 22. As illustrated, the element 19 is integral with the spider and the element 20 is detachably secured to the axial extensions or arms 21' of the spider.

Since under the described arrangement symmetry of drive depends upon accurate centering of the spider, we insure this result by providing an annular bearing 23 intermediate the spider and a fixed support. For example, one race or bearing ring 24 bears upon the shouldered portion 25 of the spider and the other bearing ring 26 bears upon a projection 27 of the hub spindle or bracket. Manifestly, we thus secure accurate centering of the spider and the correct carriage thereby of the planetary pinions 12 regardless of gear wear. Incidentally we secure, as will be evident from the several constructions shown, the piloting of the wheel driving shaft both fore and aft. For example, in Fig. 1, the spider centering bearing 23 co-operates in this way with the bearing 28. In Fig. 2, the spider centering bearing 29 is secured between the spider 30 and a sleeve 31 and co-operates with the wheel bearing 32. In Fig. 3, the spider centering bearing 33 co-operates with the paired fore bearings 34 and 35.

Having described the nature and objects of the invention, we claim:—

A wheel drive of the floating type, comprising the combination of a hub bracket and a motor casing cooperating therewith to form a gear housing, a driving shaft extending into and centered relatively to said housing by an annular bearing, a driving pinion fixedly mounted on said shaft, an annular channel rack fixedly mounted in the gear housing and presenting two sets of tracks, a planetary system of pinions having necked ends engaging said tracks and having intermediate portions engaging the driving pinion, a wheel or driven shaft, a spider splined to the driven shaft and carrying journals for the planet pinions, and spaced annular bearings for the driven shaft and spider and acting in concert with the centered driving shaft to secure a rythmic functioning of the gearing regardless of wear on the teeth.

In testimony whereof we affix our signatures.

AXEL HJ. ASPROOTH.
ALFONSO M. LEONI.